United States Patent [19]

Dames

[11] Patent Number: 5,048,351
[45] Date of Patent: Sep. 17, 1991

[54] MASS FLOW SENSOR
[75] Inventor: Andrew N. Dames, London, England
[73] Assignee: Schlumberger Industries Limited, Farnborough, Hampshire, England
[21] Appl. No.: 454,248
[22] Filed: Dec. 21, 1989
[30] Foreign Application Priority Data
 Dec. 24, 1988 [GB] United Kingdom ................ 8830257
[51] Int. Cl.⁵ .............................................. G01F 1/84
[52] U.S. Cl. ................................ 73/861.38; 73/861.21
[58] Field of Search ........... 73/861.18, 861.36, 861.37, 73/861.38

[56] References Cited
U.S. PATENT DOCUMENTS
 4,420,983 12/1983 Langdon ........................... 73/861.18
 4,596,153 6/1986 MacDonald et al. ............. 73/861.18

Primary Examiner—Herbert Goldstein
Attorney, Agent, or Firm—Sanford J. Asman

[57] ABSTRACT

A coriolis-type mass flow sensor suitable for aerospace use comprises a tuning fork which is immersed in the fluid whose mass flow is to be sensed, such that its tines extend across (i.e. perpendicular to) the direction of flow of the fluid. The whole tuning fork is elongated in the direction of flow of the fluid, so that the fluid flows over (and between) the tines: typically, the fork may be up to 15 cm long in the direction of flow. The tines are excited to vibrate perpendicularly to the direction of flow of the fluid by several piezoelectric drive devices held under compression in, and distributed symmetrically about the midlength of, the yoke from which the tines project, while the vibrations are sensed by respective piezoelectric pickup devices within each end of the yoke. The phase difference between the vibrations sensed by the two pickup devices is a function of the mass flow of the fluid. In an alternative form, the sensor has two pairs of tines symmetrically distributed around the yoke as a kind of double tuning fork, while in another alternative form, the tines are formed integrally with, and project into, a short section of cylindrical pipe.

12 Claims, 5 Drawing Sheets

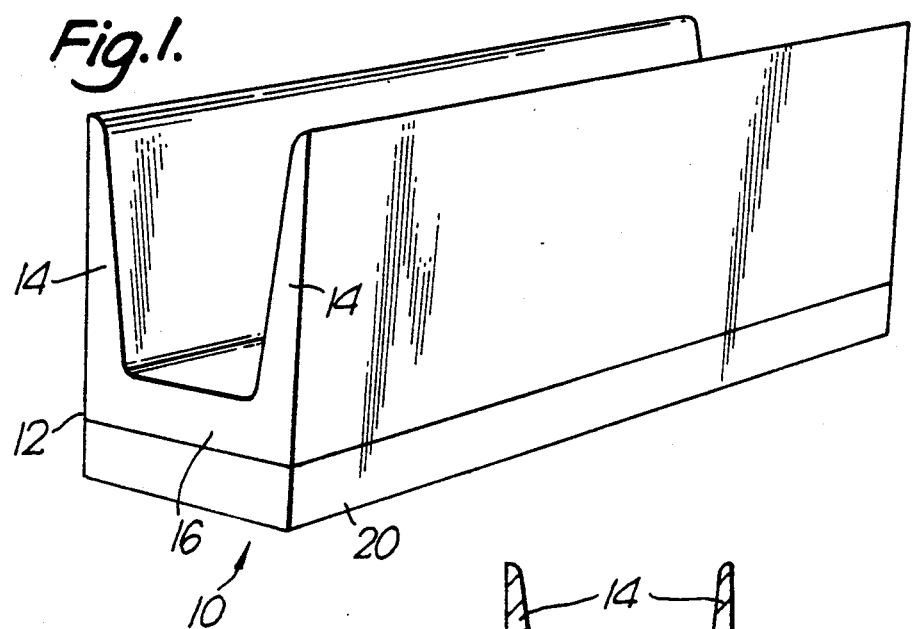
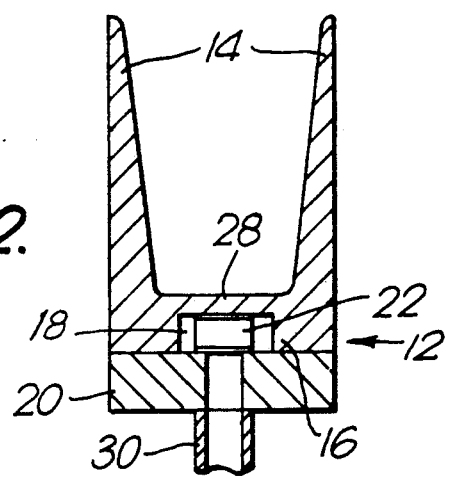
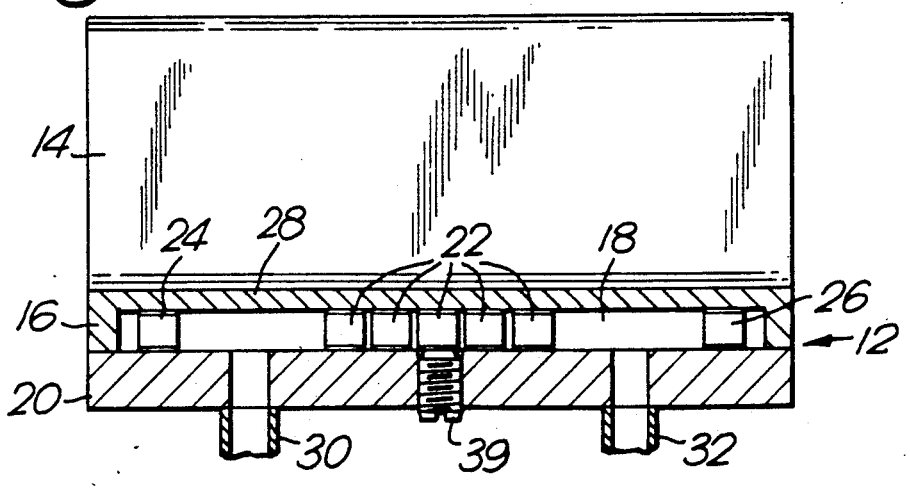
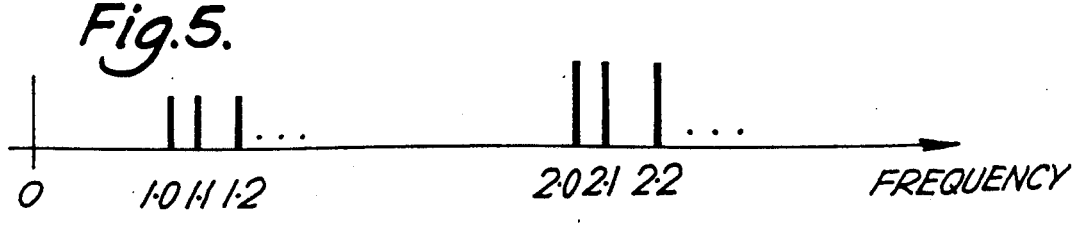

⊗ = DISPLACEMENT INTO PLANE OF DWG.
• = DISPLACEMENT OUT OF PLANE OF DWG.
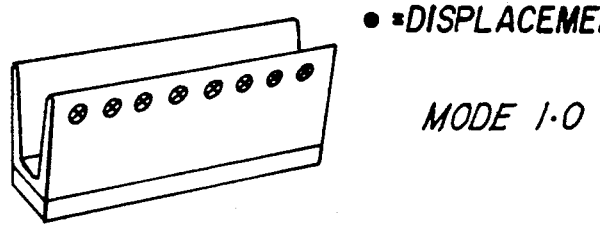
Fig. 4(a)    MODE 1·0
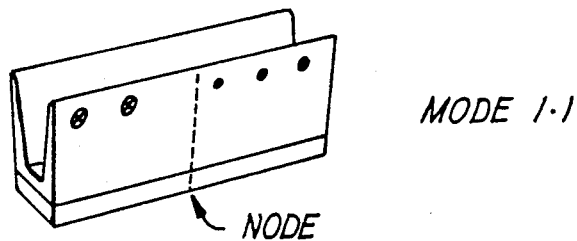
Fig. 4(b)    MODE 1·1
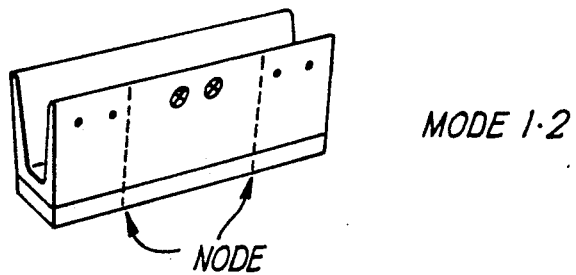
Fig. 4(c)    MODE 1·2
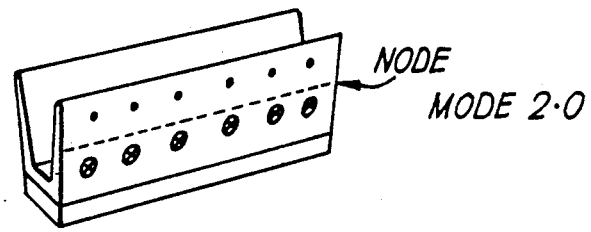
Fig. 4(d)    MODE 2·0
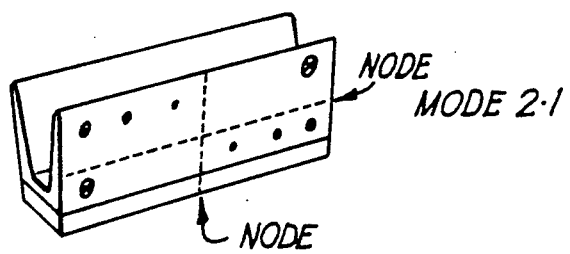
Fig. 4(e)    MODE 2·1

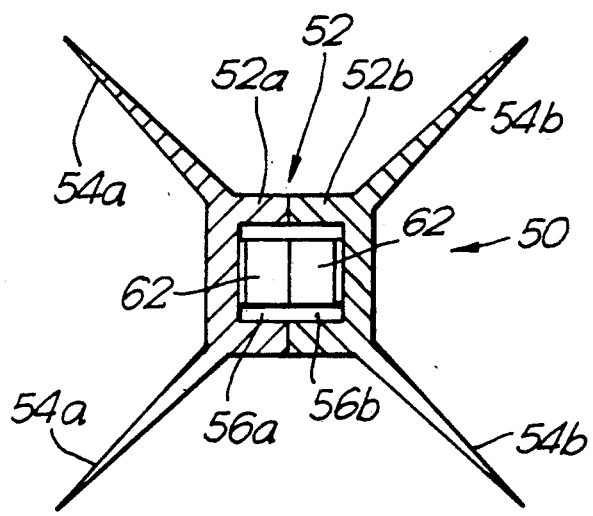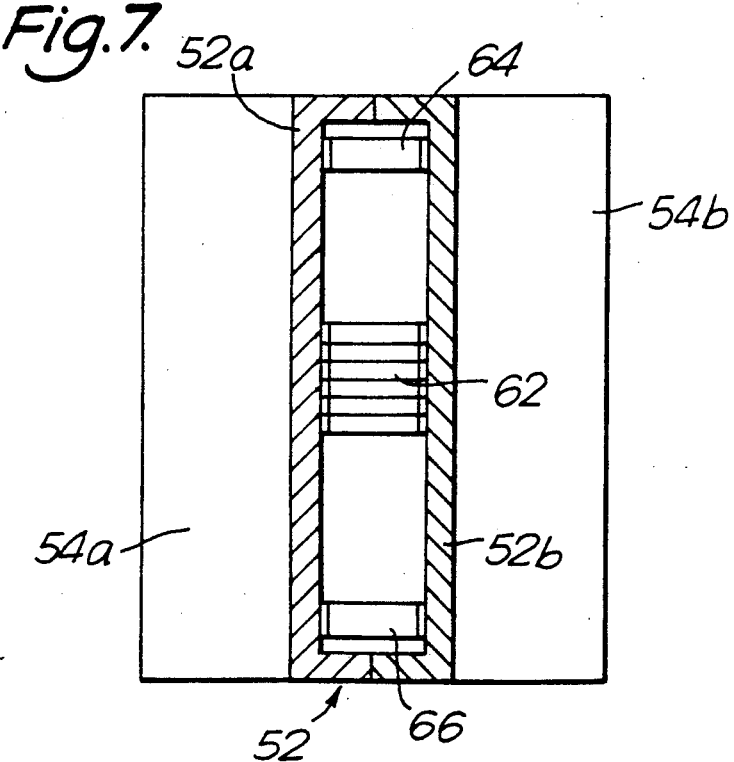

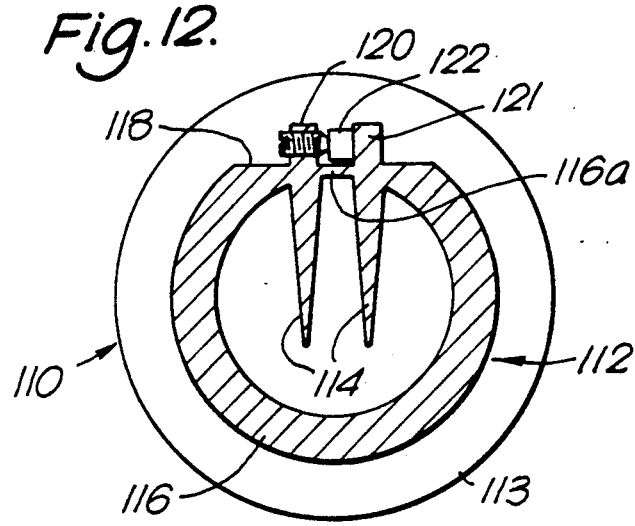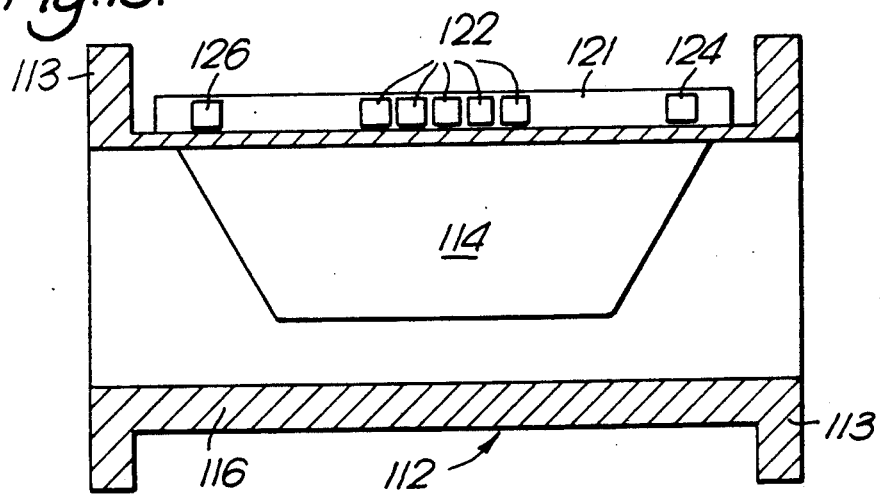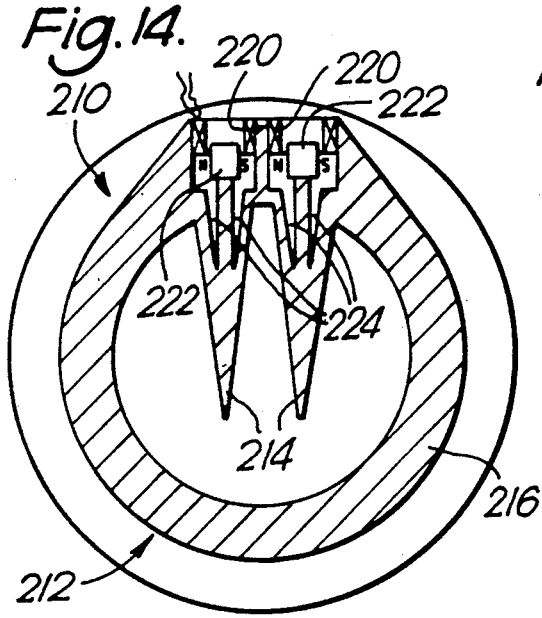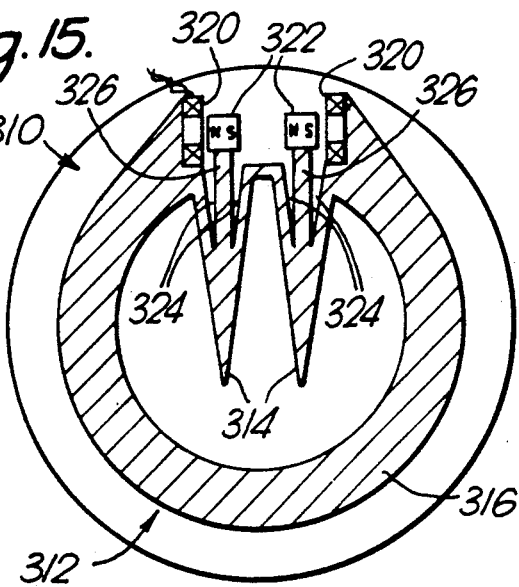

MASS FLOW SENSOR

This invention relates to mass flow sensors, and is more particularly concerned with mass flow sensors which operate in accordance with the coriolis principle.

One known form of prior art coriolis-type mass flow sensor comprises a straight tube which is vibrated transversely as the fluid whose mass flow is to be sensed flows through it. The tube is typically resonantly vibrated in its third harmonic mode, and a signal representative of the mass flow of the fluid is obtained by sensing the phase difference between the vibrations at two points spaced apart along the length of the tube. Such a sensor is disclosed in our U.S. patent application Ser. No. 07/167,087 filed Mar. 11, 1988 and U.S. Pat. No. 4,962,671 issued Oct. 16, 1990.

However, this prior art sensor suffers from the drawback that, in order to obtain a sufficiently large phase difference to provide a reasonably accurate mass flow measurement over a wide range of mass flow rates and pressures, the tube needs to be relatively long and robust, to an extent which makes it much too large and heavy for aerospace applications.

Another known form of prior art coriolis-type mass flow sensor, described in United Kingdom Patent No. 2 071 848 and 2 131 950, comprises a flat elongated vane or strip, which is immersed in the fluid whose mass flow is to be sensed so as to extend along the direction of flow, and which is vibrated from one end to produce a travelling flexure wave in the direction of flow.

However, this second form of prior art sensor suffers from a similar drawback to that of the first mentioned sensor, in that in order to obtain useful phase difference signal in the space normally available in an aerospace context, the vane or strip needs to be extremely thin and compliant. This makes it very difficult to provide efficient vibration drive and pick-up means which are isolated from the fluid environment to the required extent.

It is therefore an object of the present invention to provide a mass flow sensor which is suitable for use in aerospace applications, but in which the drawbacks of the prior art sensors are substantially alleviated.

According to the present invention, there is provided a mass flow sensor comprising:

a sensing element comprising a resonantly vibratable structure adapted for immersion in a fluid whose mass flow is to be sensed;

means for exciting resonant vibrations of said structure; and means for sensing the vibrations at respective points on said structure spaced apart along the direction of flow of the fluid;

wherein the structure comprises at least one pair of substantially similar vanes, which are elongated in, and generally aligned with, the direction of flow of the fluid, which are coupled together by and project substantially symmetrically from a common yoke, and which are resonantly vibratable substantially perpendicular to the direction of flow of the fluid at a common frequency but in antiphase with each other.

The yoke may be adapted to be fully immersed in the fluid, in which case the sensor may comprise two or three similar pairs of vanes projecting from the yoke, the pairs being arranged symmetrically around the yoke, and the vanes of each pair being resonantly vibratable in antiphase with each other at the common frequency. The vanes are preferably all formed integrally with the yoke. The yoke may be hollow, with the exciting and sensing means disposed thereinside.

Alternatively, the sensor may comprise a pipe through which the fluid is arranged to flow, the yoke being arranged to form part of the wall of the pipe and the vanes projecting into the pipe therefrom.

In either case, the exciting means may be disposed substantially midway along the length of the yoke, and the sensing means may comprise respective sensing devices disposed on either side of the exciting means.

The invention will now be described, by way of example only, with reference to the accompanying drawings, in which:

FIG. 1 is a perspective view of one embodiment of an aerospace mass flow sensor in accordance with the present invention;

FIGS. 2 and 3 are sectional views of the sensor of FIG. 1;

FIGS. 4A–4E illustrate some possible modes of resonant vibration of the sensor of FIGS. 1 to 3;

FIG. 5 is a graphical representation of the resonant frequencies of vibration for the various vibration modes of FIG. 4;

FIGS. 6 and 7 show an alternative embodiment of an aerospace mass flow sensor in accordance with the present invention;

Figure 8:
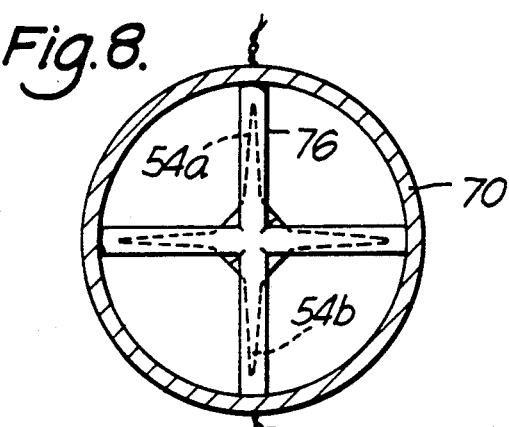

FIGS. 8 to 11 show to alternative ways of mounting the sensor of FIGS. 6 and 7 in a fuel flow duct in an aircraft engine fuel control system; and FIGS. 12 and 13 show a further embodiment of an aerospace mass flow sensor in accordance with the present invention; and FIGS. 14 and 15 show two further embodiments of aerospace mass flow sensors in accordance with the present invention;

The aerospace mass flow sensor of FIGS. 1 to 3 is indicated generally at 10, and comprises an elongate yoke 12 having two generally similar parallel vanes 14 projecting symmetrically therefrom along its whole length: the sensor 10 thus resembles a tuning fork which has been elongated or extended in a direction perpendicular to the plane containing its tines. Typically, the yoke 12 is up to 15 cm long by about 1 cm wide, while the vanes 14 project about 1.5 cm from the yoke and are about 0.3 cm thick at their roots. As will become apparent, the sensor 10 is adapted to be mounted in a fluid flow conduit (not shown), in particular a main fuel supply conduit in an aircraft engine fuel control system, with the longitudinal axis of the yoke 12, and thus the vanes 14, aligned with the direction of flow of the fluid, so that the fluid flows between and on both sides of the vanes 14.

The yoke 12 is made in two parts, a first part 16 integral with the vanes 14 and containing a rectangular recess 18 which faces away from the space between the vanes, and a second part 20 comprising a substantially solid rectangular block which is electron-beam welded to the first part 16 around the entire periphery of the recess 18, so closing the recess. Both parts 16, 20 of the yoke 12, and the vanes 14, are typically made from stainless steel, although NiSpan C can be used if desired.

Disposed inside the recess 18, under compression, is a drive unit comprising up to five piezoelectric drive devices 22 and two piezoelectric pick-up devices 24, 26, the devices 22 being positioned closely adjacent each other and substantially symmetrically about the midpoint of the length of the yoke 12 and the devices 24, 26 being positioned symmetrically on each side of the devices 22, close to the opposite ends of the yoke 12. Each of the devices 22, 24, 26 is bonded to but electrically insulated from the base 28 of recess 18, which is relatively thin (0.2 cm) and extends between the roots of the vanes 14. Furthermore, each of the devices 22, 24, 26 is held under a predetermined compression against the base 28 of the recess 18, by means of threaded inserts (or grub screws) 39 which pass wholly through the block 20 and which can be screwed in or out to adjust the compression: only one of these inserts is shown (in FIG. 3), for the sake of clarity. In practice, each of the devices 22, 24, 26 is sandwiched between two tapered washers, this assembly being formed as a unit, inserted into the recess 18 via the tapped hole for the grub screw 39, and then secured in position by screwing in the grub screw.

The devices 22 are energised by an alternating electrical signal provided by a combined output and drive circuit (not shown) of the kind disclosed in our United States patent application Ser. No. 07/454,250, filed Dec. 21, 1989 and entitled "A Combined Output and Drive Circuit for Mass Flow Transducer". This alternating signal causes the devices to alternately expand and contract, thus flexing the base 28 of the recess 18 between the vanes 14 and so causing the vanes to vibrate resonantly in antiphase, perpendicular to the direction of flow of the fluid.

The vibrations of the vanes 14 are sensed by the pick-up devices 24 and 26, whose electrical output signals form the input signals to the aforementioned combined output and drive circuit. The positive feedback provided by the combined output and drive circuit maintains resonant vibration of the vanes 14, while the phase difference between the respective vibrations sensed by the pick-ups 24 and 26 is representative of the mass flow of the fluid flowing over the vanes (in fact this phase difference, divided by the frequency of the vibrations, is proportional to mass flow). It has been found that, for a sensor 10 having the dimensions quoted above, phase differences of up to about 3° per m/sec of flow rate can be achieved.

To mount the sensor 10 in the conduit, the block 20 is provided with two spaced mounting pillars 30, 32, one positioned midway between the devices 22 and the device 24 and the other positioned midway between the devices 22 and the device 26. The pillars 30, 32 are adapted to pass sealingly through respective orifices provided in the wall of the conduit, for example by being welded to the respective peripheries of these orifices: in this case, the sensor 10 is permanently mounted in its own short section of conduit, which is preferably flanged at each end for connection in flow series in the conduit in which fluid mass flow rate is to be sensed. Further, the pillars 30, 32 are hollow, so that the electrical wiring required to make electrical connections to the devices 22, 24, 26 can pass therethrough. Finally, the pillars 30, 32 can incorporate bellows or other flexible sections, to at least partially isolate the sensor 10 from external vibrations which might otherwise be transmitted thereto from the conduit in which it is mounted: however, if the vanes 14 of the sensor 10 are accurately balanced, this should not be necessary.

FIG. 4 illustrates five possible modes of resonant vibration of the sensor 10. Thus FIG. 4(a) shows the mode 1.0, where the first number refers to the order (or harmonic) of vibrations perpendicular to an axis in the vane 14 parallel to the longitudinal axis of the yoke 12, while the second figure refers to the order (or harmonic) of vibrations perpendicular to an axis in the vane perpendicular to the longitudinal axis of the yoke. FIGS. 4(b) and 4(c) show the modes 1.1 and 1.2 respectively, while FIGS. 4(d) and 4(e) show the modes 2.0 and 2.1 respectively.

The preferred vibration mode for the sensor 10 is the mode 1.0. It will be noted from FIG. 5, which shows the frequencies of the various modes, that the frequencies of the secondary modes 1.1, 1.2 etc are rather close to that of the mode 1.0. However, careful positioning of the drive and pickup devices 22, 24, 26, as well as the use of five drive devices 22 distributed as shown, ensures that the mode 1.0 is preferentially excited.

Several modifications can be made to the sensor 10. For example, the five drive devices 22 can be replaced by three drive devices, or even a single drive device, as long as enough drive energy can still be imparted to the vanes 14. Also, the two parts 16, 20 can be made integral with each other, by extruding or otherwise making them as one piece.

The aerospace mass flow sensor of FIGS. 6 and 7 is indicated generally at 50, and in effect comprises two of the sensors 10 of FIGS. 1 to 3 with their blocks 20 removed and their first parts 16 welded together back-to-back. Thus the sensor 50 comprises a yoke 52 made in two identical halves 52a and 52b, each half having a pair of similar vanes 54a, 54b formed integrally therewith and projecting symmetrically therefrom, and containing a respective recess 56a, 56b which faces away from the direction in which the respective vanes 54a and 54b project. The two halves 52a and 52b of the yoke 52 are welded together around the peripheries of their respective recesses 56a, 56b, so that the vanes 54a project in the opposite direction from the vanes 54b, while the recesses 56a, 56b together form a single common recess. The vanes of each pair 54a and 54b can be substantially parallel to each other, or can diverge by up to 90° as shown: the important thing is that they project symmetrically from the yoke 52. The sensor 50 is again made from stainless steel or NiSpan C, and the dimensions of the yoke 52 and each of the vanes 54a, 54b are similar to those mentioned earlier for the yoke 12 and vanes 14 of the sensor 10.

The vanes of each pair 54a, 54b can be excited to vibrate in antiphase with each other, at a common frequency, by five piezoelectric drive devices similar to, and distributed similarly to, the devices 22 of the sensor 10, these devices being held in compression against the base 58a or 58b of one of the recesses 56a, 56b by threaded inserts passing through the base 58b or 58a of the other recess. In this case, the vibrations are sensed by two piezoelectric pick-up devices which are mounted similarly to the five drive devices, and disposed analogously to the pick-up devices 24, 26 of the sensor 10.

Alternatively and preferably, each single piezoelectric drive and pick-up device is replaced by a pair of such devices mounted back-to-back, with a common electrode on their respective contacting faces: these pairs of devices are indicated in FIGS. 6 and 7 at 62 (for the five pairs of drive devices) and 64 and 66 (for the two pairs of pick-up devices), and they are again formed as units with tapered washers, as described in relation to the sensor 10.

In either case, resonant vibration is maintained, and a mass flow output signal is produced, by the combined output and drive circuit mentioned earlier.

The "double" sensor 50 has the advantage over the sensor 10 that it is a fully symmetrical and balanced structure, and therefore less subject to damping from its mounting structure (which damping causes frequency errors).

In an alternative method of making the sensor 50, it is extruded or otherwise made as a single piece, with the yoke 52 generally circular and hollow, and the vanes 54a, 54b distributed uniformly therearound, each 90° from its neighbour.

Figure 9:
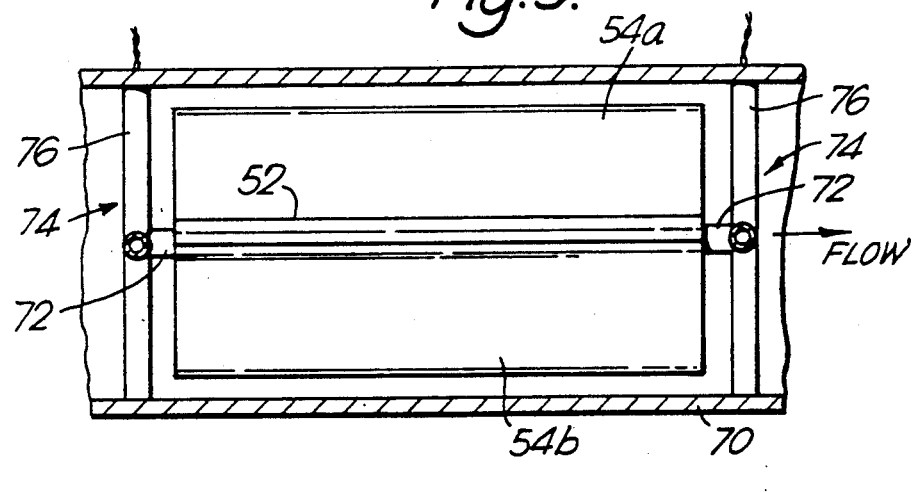

FIGS. 8 and 9 show a preferred method of mounting the sensor 50 in its own short conduit section 70 (which is preferably flanged as mentioned earlier in relation to the sensor 10). Thus the sensor 50 is supported at each end of the yoke 52 by short hollow stub supports 72, which are each welded to and project axially from their respective end of the yoke. Each stub support 72 is in turn welded to the centre of a generally cruciform support member 74 whose four legs 76 extend generally radially of the conduit section 70, in approximate alignment with the vanes 54a, 54b, and are welded to the wall of the conduit section. The alignment of the legs 76 with the vanes 54a, 54b serves to protect the leading edges of the vanes.

At least one of the legs 76 of each support member 74 is hollow, and communicates both with the outside of the conduit section 70 and with the interior of the stub support 72, while the interior of the stub support 72 communicates in turn with the combined recesses 56a, 56b within the yoke 52, thus providing a route for the electrical connections to the pairs of piezoelectric devices 62, 64, 66.

The stub supports 72 can incorporate bellows or like vibration isolating sections as mentioned in relation to the pillars 30, 32 of the sensor 10.

In a variation of the embodiment of FIGS. 8 and 9, the cruciform members 74 can be replaced by a single radial pillar extending perpendicularly from, and integral with, the stub support 72.

Figure 10:
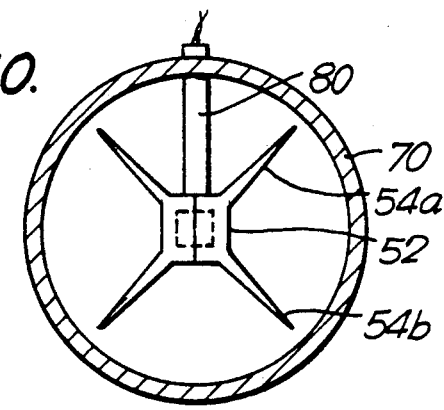
Figure 11:
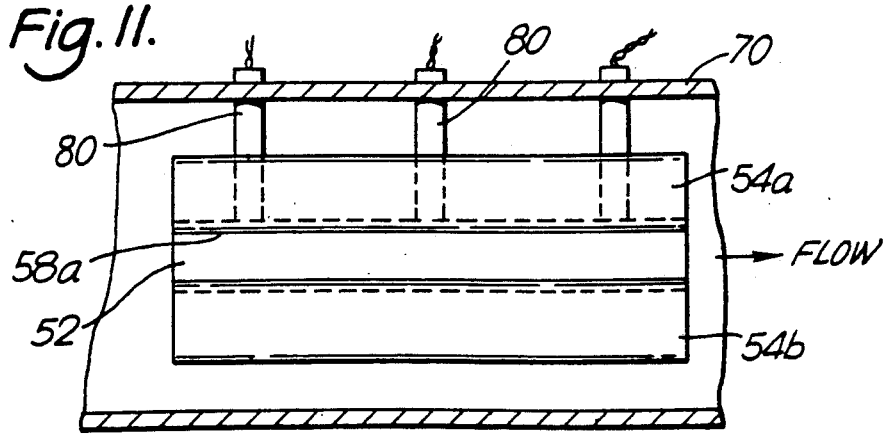

FIGS. 10 and 11 show an alternative method of mounting the sensor 50, using hollow pillars 80, substantially identical to the pillars 30, 32 of the sensor 10, welded to the yoke 52 on the outside thereof.

In other embodiments of the invention, the sensor can have three pairs of vanes distributed symmetrically around a common yoke, with the vanes of each pair being driven to vibrate resonantly in antiphase at a common frequency.

The aerospace mass flow sensor of FIGS. 12 and 13 is indicated generally at 110, and is formed integrally with a pipe through which the fluid whose mass flow is to be sensed flows.

Thus the sensor 110 comprises a short section of cylindrical pipe 112 having mounting flanges 113 at each end thereof. Two generally similar parallel vanes 114, which are in turn generally similar to the vanes 14 of the sensor 10, are formed integrally with the cylindrical wall 116 of the pipe 112 so as to project into the pipe, so that the portion 116a of the wall between the respective roots of the vanes 114, which portion is thinned and externally flattened as shown at 118 in FIG. 12, effectively constitutes a yoke equivalent to the yoke 12 of the sensor 10.

The wall portion or yoke 116a has a pair of radially outwardly extending projections or flanges 120, 121 aligned with respective ones of the vanes 114, and extending longitudinally along the pipe 112 over the entire length of the vanes, so as effectively to form extensions of the roots of the vanes. Piezoelectric drive and pick-up devices 122, 124, 126, similar to the devices 22, 24, 26 of the sensor 10, are distributed along the length of the gap between the flanges 120, 121, and are mounted in compression in this gap, in a manner generally analogous to the mounting of the devices 22, 24, 26 of the sensor 10. One of these devices, specifically one of the devices 122, is shown in FIG. 12, where it can be seen that a bolt or grub screw 124 passes through the flange 120, in screw-threaded engagement therewith, to enter the gap between the flanges 120, 121 and compress the device 122 against the flange 121, the device 122 again being sandwiched between tapered washers (not shown) as described in relation to the sensor 10. Energisation of the devices 122 by an alternating signal of the kind described in relation to the sensor 10 tends alternately to push the flanges 120, 121 apart and then let them come back together, so flexing the wall portion or yoke 116a between them and causing the vanes 114 to vibrate in antiphase.

The embodiments of the invention shown in FIGS. 14 and 15 are indicated at 210 and 310 respectively, and are basically similar to the sensor 110 of FIGS. 12 and 13, to the extent that they each comprise a short section of cylindrical pipe, 212 and 312 respectively, having a pair of generally similar parallel vanes, 214 and 314 respectively, formed integrally with the wall, 216 and 316 respectively, of the pipe so as to project into the pipe. However, the vanes 214 and 314 are driven into antiphase vibration, and the vibration is sensed, electromagnetically, by respective coils 220 and 320 respectively and magnets 222 and 322 respectively, positioned analogously to the piezoelectric devices 122, 124, 126 of the sensor 110. To facilitate this, parallel slots, 224 and 324 respectively, are cut into the roots of the vanes 214, 314 from the outside of the respective pipes 212, 312, leaving root portions 226 and 326 respectively exposed from the outside of the pipes. Respective permanent magnets 228 and 238 are secured to the tips of the root portions 226 and 326, and driven or sensed by their respective coils 220 and 320. The coils 220 have their axes aligned with their respective vanes 214 (ie extend approximately radially of the pipe 212), while the axes of the coils 320 are aligned with each other and extend generally tangentially of the pipe 312.

The sensors 110, 210 and 310 are preferably all machined from single pieces of metal, eg NiSpan C or stainless steel.

I claim:

1. A mass flow sensor comprising:
   a sensing element comprising a resonantly vibratable structure adapted for immersion in a fluid whose mass flow is to be sensed;
   means for exciting resonant vibrations of said structure; and
   means for sensing the vibrations at respective points on said structure spaced apart along the direction of flow of the fluid;
   wherein the structure comprises at least one pair of substantially similar vanes, which are elongated in, and generally aligned with, the direction of flow of the fluid, which are coupled together by and project substantially symmetrically from a common yoke, and which are resonantly vibratable substantially perpendicular to the direction of flow of the fluid at a common frequency but in antiphase with each other.

2. A mass flow sensor as claimed in claim 1, comprising two similar such pairs of vanes projecting from the yoke, the pairs being arranged symmetrically around the yoke, and the vanes of each pair being resonantly vibratable in antiphase with each other at the common frequency.

3. A mass flow sensor as claimed in claim 1, wherein the vanes are all integral with the yoke.

4. A mass flow sensor as claimed in claim 1, wherein the vanes and the yoke are formed as a single piece.

5. A mass flow sensor as claimed in claim 1, wherein the yoke is hollow, with the exciting and sensing means disposed thereinside.

6. A mass flow sensor as claimed in claim 1, further comprising a pipe through which, in use, the fluid is arranged to flow, wherein said yoke is formed by part of the wall of the pipe and said vanes project into the pipe therefrom.

7. A mass flow sensor as claimed in claim 6, wherein said pipe and vanes are integral with each other.

8. A mass flow sensor as claimed in claim 1, wherein the exciting means is disposed substantially midway along the length of the yoke, and the sensing means comprises respective sensing devices disposed on either side of the exciting means.

9. A mass flow sensor as claimed in claim 1, wherein the exciting and sensing means are piezoelectric.

10. A mass flow sensor as claimed in claim 1, wherein the exciting and sensing means are magnetic.

11. A mass flow sensor as claimed in claim 1, wherein the leading and/or trailing edges of the vanes are inclined to respective planes perpendicular to the direction of flow of the fluid so as to facilitate the shedding of debris therefrom.

12. A mass flow sensor as claimed in claim 11, wherein the leading and trailing edges are inclined in the direction of flow of the fluid from root to tip and from tip to root respectively.

* * * * *